G. H. LEE.
INCUBATOR.
APPLICATION FILED NOV. 5, 1910.
1,053,734.
Patented Feb. 18, 1913.
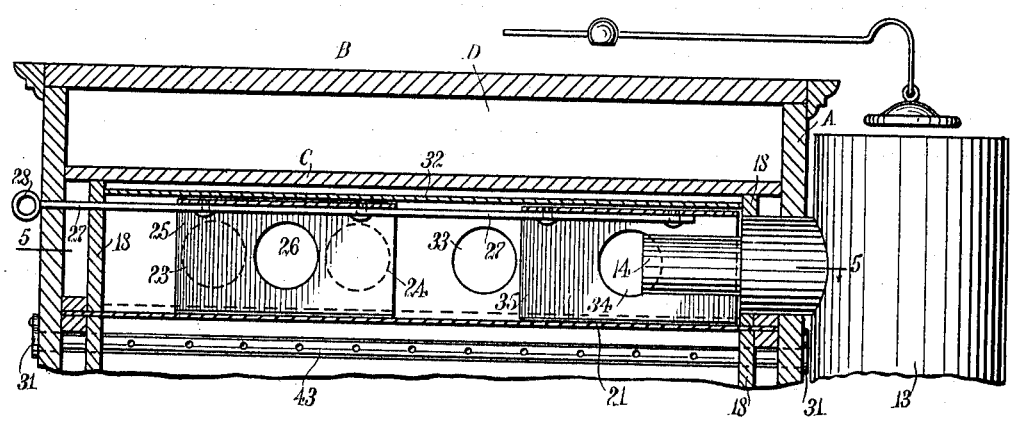
WITNESSES
INVENTOR
George H. Lee
BY
ATTORNEYS

UNITED STATES PATENT OFFICE.

GEORGE HOWARD LEE, OF OMAHA, NEBRASKA.

INCUBATOR.

1,053,734.  Specification of Letters Patent.  Patented Feb. 18, 1913.

Application filed November 5, 1910. Serial No. 590,824.

*To all whom it may concern:*

Be it known that I, GEORGE H. LEE, a citizen of the United States, and a resident of Omaha, in the county of Douglas and State of Nebraska, have invented a new and Improved Incubator, of which the following is a full, clear, and exact description.

Among the principal objects which the present invention has in view are: to provide means for controlling the distribution of heat within the radiating chamber; to provide a mechanism for controlling the passage of heat into the radiating chamber, which mechanism is simple and economical in construction; and to provide means disposed on the outer side of the incubator whereby the disposition of dampers for controlling the heat passages may be ascertained.

One embodiment of the present invention is disclosed in the accompanying drawing, which is a longitudinal vertical section of an incubator provided with a heating system constructed and arranged in accordance with the present invention.

As illustrated in the accompanying drawing, the heat is generated within a drum 13. The drum 13 is arranged and constructed so that the heated air is delivered therefrom by means of a flue 14. The heated air is, by the flue 14, delivered within a distributing flue constructed and arranged in accordance with the present invention, the purpose thereof being to distribute the heat and to control the point of delivery thereof.

The construction of the incubator is substantially the same as ordinary incubators. The side walls A, A are surmounted by a top wall or roof B, which is separated from the radiating chamber by means of a non-conducting partition C. The partition C may be constructed of any suitable material, such as prepared wood or asbestos board. The object of the partition C is to prevent the radiation of heat upward to pass outward through the top B or be reduced by contact therewith. For this purpose the space D is air tight, forming thereby a stratum of dead air which serves to prevent radiation of the heat. The heat radiating chamber is disposed across the body of the incubator and forms the top of the incubating chamber. The walls of the incubating chamber and the side walls adjacent the radiating chamber are separated from the outer walls by non-conducting partitions 18, 18. Supported by the lower sections of the said partitions 18, is a sheet metal plate 21. The plate 21 forms the bottom of the radiating chamber and the radiating surface for heating the incubating chamber.

Supported above the plate 21, and riveted thereto, is a box-like flue 32. It is within the end of the flue 32 that the flue 14 is extended.

In the construction shown in the drawing, the flue 32 is closed at both ends by the partitions 18, 18, and at each end the side walls of the flue 32 are perforated to form openings. The openings 23 and 24 are arranged in one end of the flue 32, and openings 33 and 34, are disposed at the opposite end of the flue 32, or the end of the said flue adjacent the flue 14. The rod 27 is elongated, and has fixedly secured thereto two box-like slide valves 25 and 35, the side sections of the walls whereof are disposed to close the openings 33 and 34 when the rod 27 is moved to a position wherein the slide valve 25 is moved to expose the openings 23 and 24. Likewise, when the rod 27 is moved so that the valve 25 closes the openings 23 and 24, the valve 35 is moved in such a position that the openings 33 and 34 are exposed. As the openings 23 and 24 or the openings 33 and 34 are exposed, the heat delivered from the flue 14 is passed from the flue 32 into the chamber 15 at the far or near end of the said flue 32, with the heating result as above outlined.

Having thus described my invention, what I claim as new and desire to secure by Letters Patent is:—

In an incubator of the character described, a tubular distributing flue having openings adjacent the ends thereof; a heater having a flue for delivering heat within said distributing flue and between the ends thereof; and means operable to close the openings at one end of said distributing flue and coincidentally exposing the openings at the opposite end of said distributing flue.

In testimony whereof I have signed this specification in the presence of two subscribing witnesses.

GEORGE HOWARD LEE.

Witnesses:
HARRY ROWLEY,
R. O'NEIL.